United States Patent Office 3,718,699
Patented Feb. 27, 1973

3,718,699
PROCESS OF PREPARING 4,4′-DITHIOBIS (2,6-DI-t-BUTYLPHENOL)
Tamotsu Fujisawa and Mizuo Yamamoto, Sagamihara, Japan, assignors to Sagami Chemical Research Center, Tokyo, Japan
No Drawing. Filed Apr. 24, 1970, Ser. No. 31,756
Claims priority, application Japan, Apr. 30, 1969, 44/32,755
Int. Cl. C07c *149/38*
U.S. Cl. 260—608          4 Claims

ABSTRACT OF THE DISCLOSURE

A new process for the preparation of 4,4′-dithiobis(2,6-di-t-butylphenol) is disclosed.

Hindered phenol, 2,6-di-t-butylphenol, is reacted with sulfur monochloride in the absence or presence of a catalytic amount of iron powder or a Lewis acid. The process yields 4,4′-dithiobis(2,6-di-t-butylphenol) economically and in a high yield.

BACKGROUND OF THE INVENTION

The instant invention relates to a process for the production of 4,4′-dithiobis(2,6-di-t-butylphenol) which is a useful antioxidant.

More particularly, the invention relates to a process for synthesizing 4,4′-dithiobis(2,6-di-t-butylphenol) which comprises reacting a sulfur monochloride with 2,6-di-t-butylphenol in the presence of a catalytic amount of iron powder or a Lewis acid.

The hitherto known method for the synthesis of the subject matter compound of the present invention is such that 4-thiocyanato-2,6-di-t-butylphenol is heated in an aqueous solution of potassium hydroxide at 100° C. for 8 hours [E. Müller et al., Ann., 645, 79 (1961)]. However, none of the conventional processes is commercially satisfactory.

DETAILED DESCRIPTION OF THE INVENTION

It is an object of this invention to provide a new process for preparing 4,4′-dithiobis(2,6-di-t-butylphenol). This and other objects of this invention will be apparent from the following description.

We previously discovered and suggested a method wherein an aromatic compound is reacted with a sulfur chloride in the presence of a catalytic amount of iron powder or a Lewis acid to obtain the corresponding symmetrical aromatic sulfide in a high yield.

In a follow-up study using, as said aromatic compound, 2,6-di-t-butylphenol which is a hindered phenol of the structure in which the positions ortho to the hydroxy radical have been substituted by bulky t-butyl radicals, we further discovered that even with this starting material, 4,4′-dithiobis(2,6-di-t-butylphenol) could be synthesized in a good yield. The instant invention is the culmination of the above finding.

The instant invention is therefore directed to a process for the synthesis of 4,4′-dithiobis(2,6-di-t-butylphenol) which comprises reacting a sulfur monochloride with 2,6-di-t-butylphenol in a polar solvent such as, for example, acetonitrile, and in the presence of a catalytic amount of iron powder or a Lewis acid.

The catalyst which is to be employed according to the invention may be selected from the group consisting of metallic iron, such as iron powder, and various Lewis acids such as ferric chloride, aluminum chloride, zinc chloride, titanium chloride, stannic chloride, etc.

Only a small proportion of the catalyst is necessary to accomplish the object of the invention, and based on the sulfur monochloride being used, usually about 0.0001 mole to 10 mole percent of the catalyst proves to be effective.

The solvent hereinbefore mentioned may be any type of solvent only if it is capable of dissolving the starting compounds and will not react with those compounds and the final product. Preferably, the reaction is conducted in a polar solvent, such as acetonitrile, in which event the desired compound can be obtained in a good yield.

In carrying the invention into practice, the catalyst is added to a solution of 2,6-di-t-butylphenol in a solvent and the reaction temperature is maintained at −78° to 100° C. and, preferably below 0° C. The sulfur chloride is then added. While the reaction time should vary with different reaction temperatures, the reaction generally goes to completion in about 1 to about 24 hours. After the reaction is complete, the product may be recovered from the reaction mixture by a conventional method.

The following examples are not limitative but merely illustrative of the instant invention. In the examples, all "parts" are by weight unless otherwise specified.

Example 1

In 23.4 parts dry acetonitrile was dissolved 20.6 parts 2,6-di-t-butylphenol, followed by the addition of a catalytic amount (0.005 part) of iron powder. The internal atmosphere of the reaction vessel was replaced with nitrogen gas, and while the system was chilled to −30°−−40° C., a solution of 6.8 parts sulfur monochloride ($S_2Cl_2$) in 15.6 parts acetonitrile was gradually added dropwise, whereupon hydrogen chloride gas was evolved. After the dropwise addition was complete, the system was stirred at room temperature for a further 18 hours. The resulting crystals were finally recrystallized from n-hexane. The procedure gives crystals of 4,4′-dithiobis(2,6-di-t-butylphenol) melting at 145°–147° C. Yield 84%.

Example 2

In 15.6 parts dry acetonitrile was dissolved 41.2 parts 2,6-di-t-butylphenol, followed by the addition of a small amount of anhydrous ferric chloride. The internal atmosphere of the reaction vessel was replaced with argon gas, and at room temperature, a solution of 13.3 parts sulfur monochloride in 78 parts acetonitrile was added dropwise at a rate that induced a gradual evolution of hydrogen chloride. After the dropwise addition was complete, the system was stirred for 15 hours and the resulting crystals were allowed to recrystallize from n-hexane. The procedure yielded 70% of 4,4′-dithiobis(2,6-di-t-butylphenol).

Example 3

Under the same conditions as Example 1, except that iron powder was absent, sulfur monochloride was added dropwise at a temperature between $-15°$ and $-25°$ C. The procedure yielded 69% of 4,4'-dithiobis(2,6-di-t-butylphenol).

We claim:

1. A process for preparing 4,4'-dithiobis(2,6-di-t-butylphenol) which comprises reacting 2,6-di-t-butylphenol with sulfur monochloride in acetonitrile and in the presence of a catalytic amount of a member selected from the group consisting of iron powder and ferric chloride.

2. A process for preparing 4,4'-dithiobis(2,6-di-t-butylphenol) according to claim 1, wherein said catalyst member is used in an amount of 0.0001 mole to 10 mole percent relative to the sulfur chloride.

3. A process for preparing 4,4'-dithiobis(2,6-di-t-butylphenol) according to claim 1, wherein the reaction is conducted at a temperature between $-78°$ C. and $100°$ C.

4. A process for preparing 4,4'-dithiobis(2,6-di-t-butylphenol) according to claim 1, wherein the reaction is conducted at a temperature below $0°$ C.

References Cited

UNITED STATES PATENTS

| | | | |
|---|---|---|---|
| 2,402,685 | 6/1946 | Signaigo | 260—608 |
| 3,057,926 | 10/1962 | Coffield | 260—608 X |
| 2,299,213 | 10/1942 | Cook et al. | 260—608 X |

OTHER REFERENCES

Reid, "Organic Chemistry of Bivalent Sulfur" II, 223 (1960).

LEWIS GOTTS, Primary Examiner

D. R. PHILLIPS, Assistant Examiner

U.S. Cl. X.R.

260—609 F